Dec. 22, 1936.    H. L. MUELLER    2,065,088
RIM
Filed Jan. 28, 1932

INVENTOR.
Homer L. Mueller.
BY
Fay, Oberlin & Fay
ATTORNEYS.

Patented Dec. 22, 1936

2,065,088

UNITED STATES PATENT OFFICE 2,065,088

RIM

Homer L. Mueller, Cleveland, Ohio, assignor to The Cleveland Welding Company, Cleveland, Ohio, a corporation of Ohio Application January 28, 1932, Serial No. 589,327

4 Claims. (Cl. 301—6)

This invention relates, as indicated, to rims and has more particular reference to a form of rim construction adapted to be employed as the tire carrying medium for vehicles such as automobiles and the like.

More specifically, my invention contemplates the construction of a tire carrying rim provided with a brake-band or braking surface either formed integrally therewith or permanently attached thereto.

As is well known to those familiar with the art, the usual construction of wheels on automobiles and the like includes a tire carrying rim, either removably or fixedly secured to the wheel and a separate brake-drum wherewith the brake-shoes or bands cooperate in braking the rotation of the wheel and consequently, the vehicle.

This construction has numerous disadvantages, such as adding to the unsprung weight of the chassis and furthermore, the provision of a brake-drum on wheels which carry small diameter tires is a problem which has not been solved satisfactorily for a number of different reasons.

As above indicated, it is among the objects of my invention to provide a rim construction in which the brake-band or braking surface is directly secured to, permanently affixed to, or formed integrally with the tire carrying rim.

Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
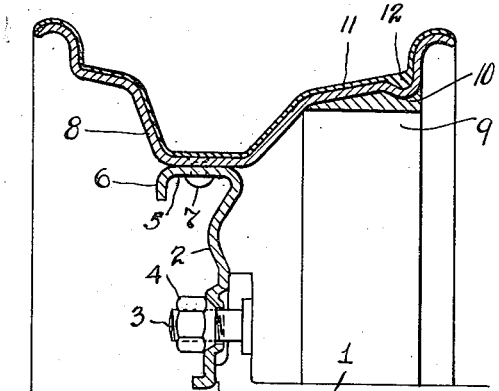
Figure 2:
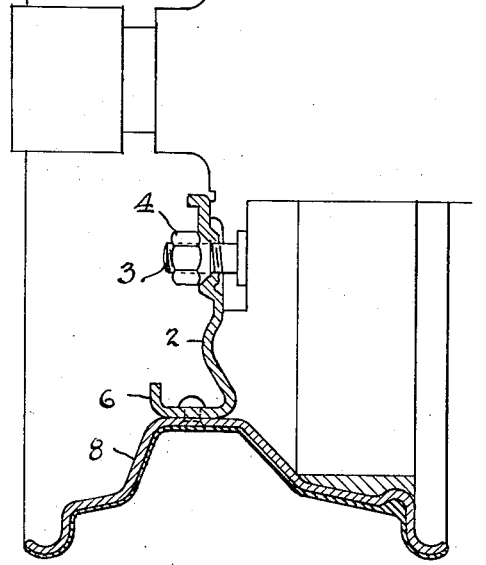
Figure 2:
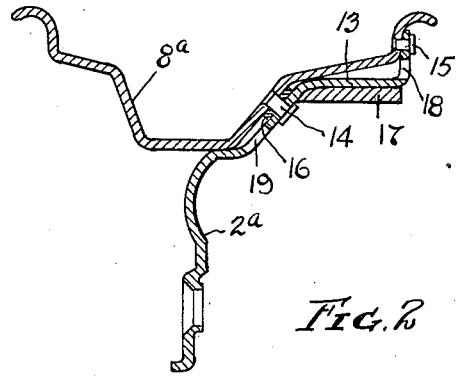
Figure 3:
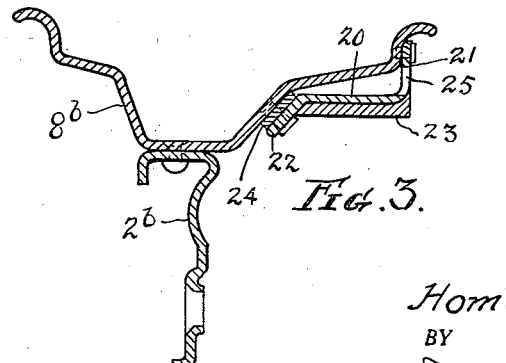

In said annexed drawing:

Fig. 1 is a sectional view of one form of rim constructed in accordance with the principles of my invention; Fig. 2 is a transverse sectional view of a modified form of the construction illustrated in Fig. 1 and in Fig. 3 is illustrated a further modification of the rim construction comprising my invention.

Referring now more specifically to the drawing and more especially to Fig. 1, it will be noted that the rim, presently to be described comprising my invention, forms part of the wheel structure designed to be secured to a hub, generally indicated at 1, which is a part of a suitable self-propelling vehicle, such as an automobile, truck, bus, trailer or the like.

A wheel constructed in accordance with the principles of my invention, as illustrated in Fig. 1, consists of a radially extending, substantially annular supporting web, generally indicated at 2, which, at circumferentially spaced points adjacent its inner periphery, is provided with a plurality of apertures adapted to fit over the securing studs 3 of the hub 1 and be removably secured to such hub by means of nuts 4.

In the form of construction illustrated in Fig. 1, the web structure 2 is provided with a peripheral axially extending flange 5 which may be terminally re-bent into the form of a radially extending flange 6 for purposes of strengthening the web structure of the wheel. Preferably fixedly secured to the axial flange 5 by means such as rivets 7 is a tire carrying rim 8 having a contour such as is generally referred to as the "drop center" type. The general form of the rim is such as to accommodate particular sizes and shapes of tires, so that such form will not be described in further detail.

A portion of the inner periphery, preferably of that part of the rim 8 lying towards the vehicle's side of the web structure 2 is provided with a permanently secured brake surface 9 which may be formed by centrifugally casting an annular filler and wearing member, indicated in cross section at 10 on this portion of the inner periphery of the rim.

When the annular band 9 is centrifugally cast to thereby permanently engage the rim 8, the inner periphery of such brake member 9 may be machined or otherwise finished to a true cylindrical surface coaxial with the hub 1.

In order to prevent the heat generated by the application of the brake-bands or shoes to the member 9 for the purpose of frictional braking rotation of the wheel, from unduly heating and consequently, deteriorating the tire carried by the rim 8, I provide a layer of heat insulating material, generally indicated at 11, on the outer periphery of the rim 8, so that the heat transmitted to such rim from the annular member 9 will be dissipated before flowing into the tire. The rim 8 in that portion adapted to support the inside bead of the tire may be so formed as to provide a greater thickness of insulating material in such area, generally indicated at 12.

Instead of centrifugally casting a wearing band such as 9 directly on the inner periphery of the tire carrying rim, as illustrated in Fig. 1, I may provide a structure such as is illustrated in Figs. 2 and 3.

In Fig. 2 is illustrated a wheel structure in which the web portion 2a is continued in the form of an axial flange 13 to which the tire carrying rim 8a is fixedly secured by means such as rivets or lugs 14 and 15. Spacer members such as 16, preferably of heat insulating material, may be interposed between the rim 8a and the supporting flange of the wheel in order to maintain a spacing between such rim and its supporting flange for the circulation of cooling air thereto. A portion of the inner periphery of the flange 13 will be provided with a facing ring 17 wherewith the brake-bands or shoes will engage. This ring may be centrifugally cast on the inner periphery of the flange 13 and then machined into cylindrical form concentric with the axis of the wheel or such band may be previously formed and then secured to its supporting flange.

In order to facilitate the radiation of the heat generated by the cooperation of the brake-bands or shoes with the braking ring 17, I provide two sets of circumferentially spaced apertures or louvers 18 and 19, respectively, on opposite sides of the brake ring 17. These louvers will be effective to cause a circulation of air through the space between the rim 8a and its supporting structure, so that no layer of insulating material need be employed on the tire carrying surface of the rim 8a.

Instead of having the web structure of the wheel continuous and integral with the brake ring supporting means, such as is illustrated in Fig. 2, the wheel may be formed as is most clearly illustrated in Fig. 3. In this figure is illustrated a structure in which the web 2b is formed similarly to the web structure of the wheel illustrated in Fig. 1 and is similarly secured to the inner periphery of the tire carrying rim 8b.

As illustrated in Fig. 3, instead of casting the braking ring directly against a portion of the inner periphery of the tire carrying rim, as illustrated in Fig. 1, a supporting structure in the form of an annular band 20 provided with peripheral flanges 21 and 22 adapted to be respectively secured to different portions of the rim structure may be utilized to support the brake ring 23 in slightly spaced relation to the inner periphery of the tire carrying rim. The braking ring 23 may be centrifugally cast against the inner periphery of the annular band 20 and then, as previously indicated, machined or otherwise finished to present a true cylindrical braking surface concentric with the axis of the wheel.

When a structure, such as is illustrated in Fig. 3, is employed, segmental spacers 24 will be positioned between the flange 22 and the rim 8b to provide spaces therebetween for the circulation of air which is admitted to the space between the rim 8b and the flange 20 or exhausted from such space through apertures or louvers, generally indicated at 25.

When a tire carrying rim and its associated wheel are constructed in accordance with the principles above explained, the provision of a separate brake-drum on the wheel is not necessary, the inner periphery of the rim or its associated structure providing the surface wherewith the brake-bands or shoes may engage to effect a braking of the wheel. In this manner, not only is the unsprung weight of the chassis appreciably reduced, but the cost of manufacture is likewise reduced.

There are numerous other advantages incidental to the employment of the principles of my invention which, it is believed, will be so apparent to those familiar with the art that a further enumeration of such advantages is unnecessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a vehicle wheel, an annular tire supporting steel rim provided on its inner periphery with a radially outwardly sloping annular area and a radially inwardly extending area adjacent the outer edge of said annular area, and an annulus of iron cast against the inner periphery of said rim over said areas, said annulus providing a cylindrical braking surface concentric with the axis of said rim.

2. In a vehicle wheel, an annular tire supporting steel rim provided on its inner periphery with a radially outwardly sloping annular area and a radially inwardly extending area adjacent the outer edge of said annular area, and an annulus of iron cast and permanently attached by such casting operation against the inner periphery of said rim over said areas, said annulus providing a cylindrical braking surface concentric with the axis of said rim.

3. In a vehicle wheel, an annular tire supporting steel rim provided on its inner periphery with a radially outwardly sloping annular area and a radially inwardly deformed area adjacent the outer edge of said annular area, the groove on the outer periphery of said rim formed by said inwardly deformed area being filled with a heat insulating medium, and an annulus of iron cast against the inner periphery of said rim over said areas, said annulus providing a cylindrical braking surface concentric with the axis of said rim.

4. In a vehicle wheel, an annular tire supporting steel rim provided on its inner periphery with a radially outwardly sloping annular area and a radially inwardly deformed area adjacent the outer edge of said annular area, said radially inwardly deformed area lying under the region occupied by one of the beads of the tire supported on said rim, an annulus of iron cast against the inner periphery of said rim over said areas, said annulus providing a cylindrical braking surface concentric with the axis of said rim, and a layer of heat insulating material over the outer periphery of said rim and filling the groove formed by said radially inwardly deformed area.

HOMER L. MUELLER.